United States Patent [19]

Takase et al.

[11] Patent Number: 6,034,954
[45] Date of Patent: Mar. 7, 2000

[54] MULTIPLEXING APPARATUS FOR TRANSIT OF SIGNALS BETWEEN SERVICE PROVIDED BY LOW-SPEED TRANSMISSION PATH AND ATM SERVICE PROVIDED BY HIGH-SPEED TRANSMISSION PATH

[75] Inventors: Akihiko Takase, Tokyo; Masahiro Takatori, Yokohama; Masaru Murakami, Yokohama; Kaori Nakayama, Yokohama; Hitoshi Yajima, Yokohama; Takaaki Toyama, Fujisawa, all of Japan

[73] Assignee: Hitachi, Ltd., Japan

[21] Appl. No.: 08/912,057

[22] Filed: Aug. 15, 1997

[30] Foreign Application Priority Data

Aug. 19, 1996 [JP] Japan ..................... 8-217470

[51] Int. Cl.[7] ............................................. H04L 12/56
[52] U.S. Cl. ................................. 370/362; 370/395
[58] Field of Search ............................. 370/362, 364, 370/365, 395, 438, 439, 466, 468

[56] References Cited

U.S. PATENT DOCUMENTS

5,535,197  7/1996  Cotton .................................. 370/414

*Primary Examiner*—Chau Nguyen
*Assistant Examiner*—Frederic D. Wilkow
*Attorney, Agent, or Firm*—Sofer & Haroun, LLP

[57] ABSTRACT

For reducing the scale of a multiplexer, a lower speed ATM interface block, an interface block for SDT mode circuit emulation, and an interface block for UDT mode circuit emulation perform processing for terminating services provided by lower speed transmission lines accommodated therein, and part of AAL processing, which is pre-processing depending on a service, for generating ATM cells from signals received by a terminated service, and send the processed signal to a higher speed line interface using a previously assigned time slot on a time-division bus. The higher speed line interface once stores the signals received from the time-division bus in a buffer, and subsequently performs certain processing including a common portion for respective signals for generating therefrom ATM cells in which the signals are stored in payloads. The generated ATM cells are multiplexed and transmitted onto a higher speed transmission line.

8 Claims, 11 Drawing Sheets

MULTIPLEXING APPARATUS FOR TRANSIT OF SIGNALS BETWEEN SERVICE PROVIDED BY LOW-SPEED TRANSMISSION PATH AND ATM SERVICE PROVIDED BY HIGH-SPEED TRANSMISSION PATH

BACKGROUND OF THE INVENTION

The present invention relates to a multiplexer for connecting services on lower speed transmission lines such as circuit, frame relay, ATM (Asynchronous Transfer Mode) and so on, and ATM services on a higher speed transmission line.

Figure 11:
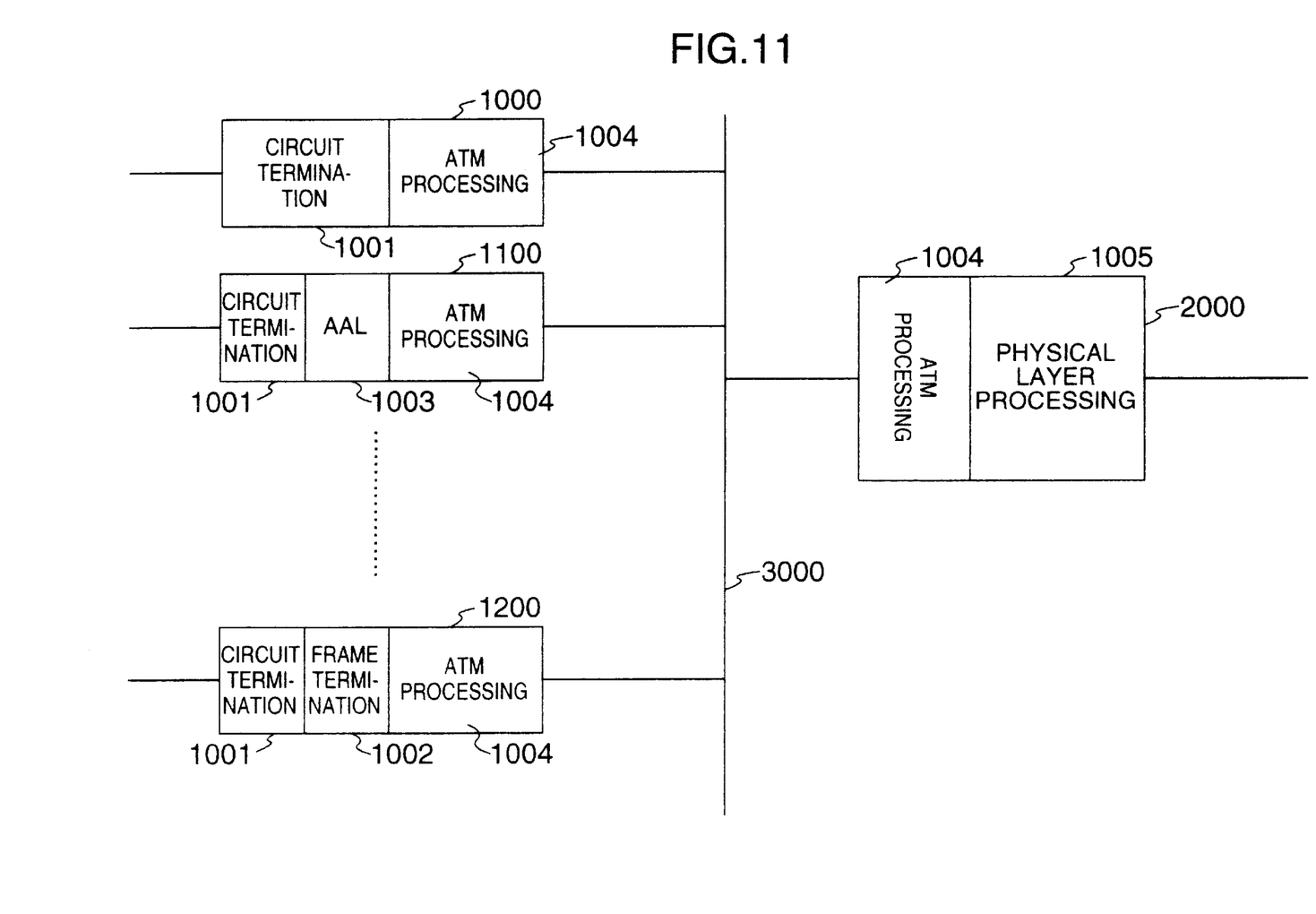
FIG. 11 is a block diagram illustrating the configuration of a conventional multiplexer.

Conventionally, a multiplexer for connecting services on lower speed transmission lines such as frame relay, ATM and so on, and ATM services on a higher speed transmission line is configured, for example, as illustrated in FIG. 11.

In FIG. 11, 2000 designates a higher speed line interface block which accommodates a higher speed transmission line for providing ATM services (hereinafter called the "higher speed ATM transmission line"); 1000 a lower speed ATM line interface block which accommodates a lower speed transmission line for providing ATM services (hereinafter called the "lower speed ATM transmission line"); 1100 a circuit emulation interface block which accommodates a lower speed transmission line for providing circuit services (hereinafter called the "circuit transmission line"); and 1200 a frame relay interface block which accommodates a lower speed transmission line for providing frame relay services such as HDLC (hereinafter called the "frame relay transmission line").

In the multiplexer as mentioned above, the lower speed ATM line interface block 1000, the circuit emulation interface block 1100 and the frame relay interface block 1200, which are associated with lower speed transmission lines, each terminate services provided by their respective transmission lines accommodated therein in a circuit termination block 1001 and a frame termination block 1002, generate ATM cells storing signals received by the terminated services in an AAL processing block 1003 and an ATM processing block 1004, and output the ATM cells to an internal transmission line 3000.

The higher speed ATM line interface block 2000, in turn, accepts ATM cells received from the lower speed transmission line 1000 at the ATM processing block 1004, multiplexes them at a physical layer processing block 1005, and transmits the multiplexed ATM cells onto the higher speed ATM transmission line.

On the other hand, signals received by the higher speed ATM line interface block 2000 from the higher speed ATM transmission line are separated in the physical layer processing block 1005 and outputted from the ATM processing block 1005 to the internal transmission line 3000 as ATM cells. These ATM cells are received respectively by the ATM processing blocks 1004 of the lower speed ATM line interface block 1000, the circuit emulation interface block 1100 and the frame relay interface block 1200, processed in the AAL processing block 1003, and thereafter converted into signals in formats in compliance with services on the lower speed transmission lines accommodated in the respective interfaces in the frame termination block 1002 and the circuit termination blocks 1001. The converted signals are transmitted onto the respective lower speed transmission lines.

Here, the AAL processing block 1003, which is a site for processing AAL layers, performs processing for adding AAL information to signals received by the circuit termination block 1001 and the frame termination block 1001 through services provided by lower speed transmission lines, processing for segmenting the signals with the information added thereto into pieces of 48-byte, which is the payload length of the ATM cell (segmentation), and so on, in order to provide services in accordance with services provided by corresponding lower speed transmission lines using payloads of ATM cells. In addition, the AAL processing block 1003 separates information of AAL included in received payloads of ATM cells, sends signals with the information of AAL excluded therefrom to the frame termination block 1002 and the circuit termination block 1001, and performs processing in accordance with the separated AAL information. The ATM processing block, in turn, is a site for performing ATM layers such as addition of an ATM header and so on.

SUMMARY OF THE INVENTION

As illustrated in FIG. 11, the conventional multiplexer comprises an ATM processing block in each of the respective interface blocks accommodating lower speed transmission lines as well as the interface block accommodating a higher speed transmission line, and is configured such that ATM cells are transmitted and received therebetween through the internal transmission line, thereby making it difficult to reduce the scale of the multiplexer.

It is therefore an object of the present invention to provide a multiplexer which has a configuration more suitable for a reduction in scale.

The present invention provides a multiplexer for interworking signals between services provided using a lower speed transmission line and ATM services provided using a higher speed transmission line, comprising:

a higher speed line interface accommodating the higher speed transmission line;

a plurality of lower speed line interface accommodating lower speed transmission lines; and a time-division bus for connecting the higher speed line interface and each of the lower speed line interfaces, wherein the lower speed line interface comprises:

a service terminator for terminating services provided using a accommodated lower speed transmission line; and a bus interface for transmitting and receiving signals, transmitted and received using a terminated service, using a time slot assigned to the lower speed transmission line on the time-division bus, services provided by lower speed transmission lines accommodated in at least two lower speed line interfaces within the plurality of lower speed line interfaces are different for each lower speed line interface, and the higher speed line interface comprises:

a transmission side ATM processing block for generating ATM cells storing signals received from respective lower speed line interfaces through the time-division bus;

a physical layer processing block for multiplexing generated ATM cells to transmit multiplexed ATM cells onto the higher speed transmission line and for separating ATM cells from signals received from the higher speed transmission line; and a reception side ATM processing block for transmitting signals stored in each of the separated ATM cells to a lower speed line interface accommodating a lower speed transmission line to which the signals are to be transmitted, using a time slot on the time-division bus assigned to the lower speed line interface.

According to the multiplexer of the present invention, since the processing for ATM layer is collectively performed for respective lower speed transmission lines in the higher speed line interface, it is not necessary to provide each of the lower speed line interfaces individually with a functional block for performing the processing for ATM layer. Further, each lower speed liner interface can utilize the function of the higher speed liner interface for processing the ATM layer only by transmitting and receiving a signal using an assigned time slot on the time-division bus. It can therefore be said that the configuration as mentioned above is more suitable for a reduction in scale of the multiplexer.

DESCRIPTION OF THE PREFERRED EMBODIMENT

One embodiment of a multiplexer according to the present invention will hereinafter be described.

Figure 1:
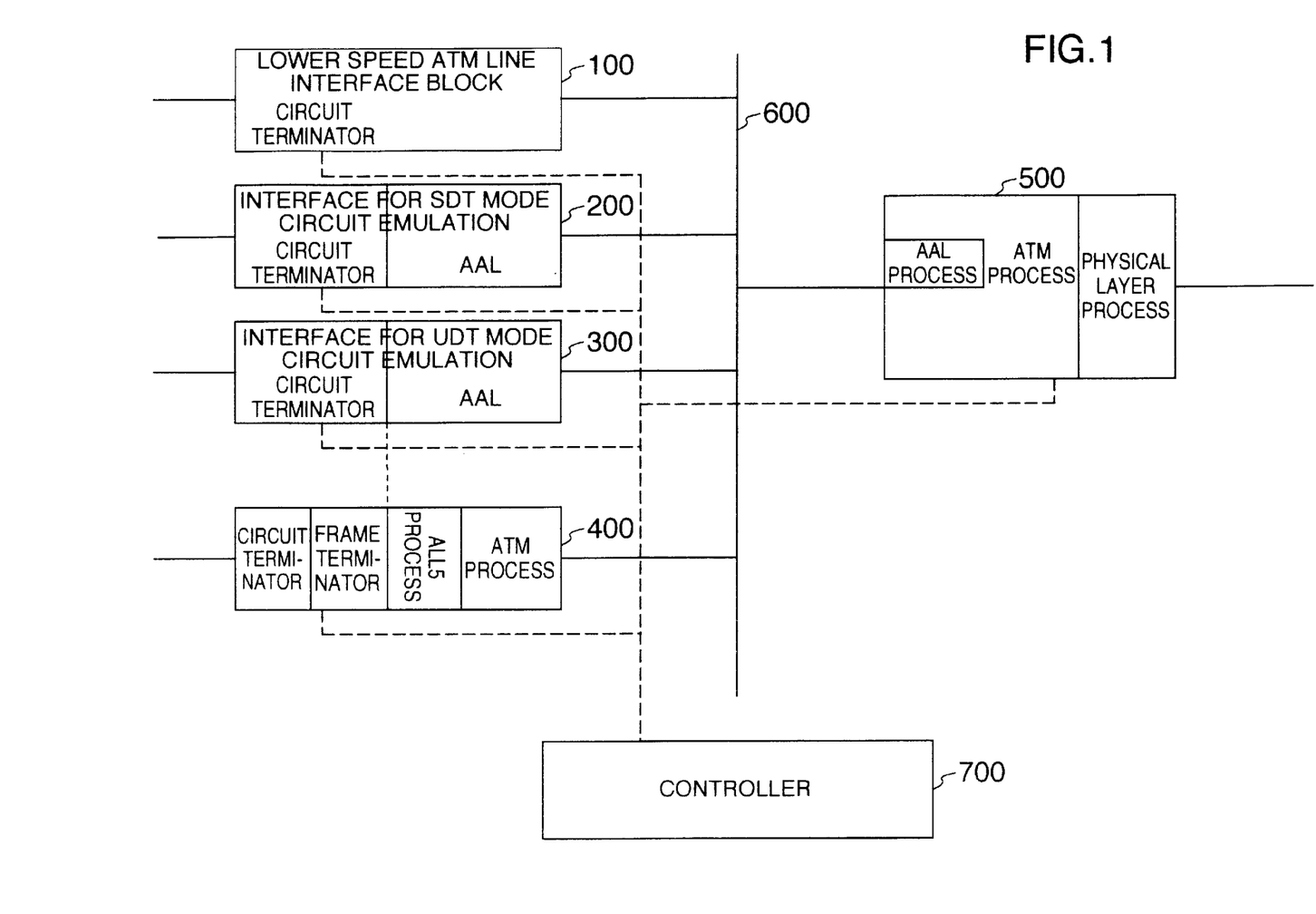
FIG. 1 is a block diagram illustrating the configuration of a multiplexer.

FIG. 1 illustrates the configuration of a multiplexer according to this embodiment.

In FIG. 1, 500 designates a higher speed line interface block accommodating a higher speed transmission line for servicing ATM services (hereinafter called the "higher speed ATM transmission line"); 100 a lower speed ATM line interface block accommodating one or a plurality of lower speed transmission lines for providing ATM services (hereinafter called the "lower speed ATM transmission line"); 200 an interface block for SDT mode circuit emulation accommodating one or a plurality of lower speed transmission lines for providing circuit services of structured data transfer (SDT) mode (hereinafter called the "SDT circuit transmission line"); 300 an interface block for UDT mode circuit emulation accommodating one or a plurality of lower speed transmission lines for providing circuit services of an unstructured data transfer (UDT) mode (hereinafter called the "UDT circuit transmission line"); 400 a frame relay interface block accommodating one or a plurality of lower speed transmission lines for providing frame relay services such as HDLC (hereinafter called the "frame relay transmission line"); and 600 a time-division bus.

In the multiplexer mentioned above, the time-division bus 600 transmits signals between the respective interface blocks in time division way. More specifically, for example, each interface block is fixedly assigned a time slot on the time-division bus 600, so that each interface block transmits signals using the assigned time slot. The assignment of time slots is determined, for example, such that signals transmitted by the respective interface blocks are multiplexed in byte interleave way on the time-division bus 600.

Now, a general description will be made on functions shared by the respective interface blocks in the multiplexer according to this embodiment.

The transmission lower speed ATM line interface block 100 performs circuit termination processing for ATM services provided by a lower speed ATM transmission line which is a PHD (Plesiochronous Digital Hierarchy) transmission line, such as DSn, En, J2 and so on. The higher speed line interface block 500 performs processing for ATM layer and processing for physical layer on the higher speed transmission line side between the transmission lower speed ATM line interface block 100 and the higher speed ATM transmission line.

Next, the interface block for SDT mode circuit emulation 200 performs circuit termination processing for circuit services provided by a lower speed circuit transmission line, which is a PDH transmission line, such as DSn, En, J2 and so on, as well as part of processing for AAL layer. In this embodiment, since the circuit services are subjected to processing for ALL type 1, the interface block for SDT mode circuit emulation 200 performs part of processing for AAL layer of AAL type 1. The higher speed line interface block 500, in turn, performs the rest of the processing for ALL layer of AAL type 1, the processing for ATM layer, and processing for physical layer on the higher speed ATM transmission line side between the interface block for SDT mode circuit emulation 200 and the higher speed ATM transmission line.

Next, the interface block for UDT mode circuit emulation 300 performs circuit termination processing for circuit services provided by a lower speed circuit transmission line, which is a PDH transmission line, such as DSn, En, J2 and so on, as well as the processing for AAL layer of AAL type 1. The higher speed line interface block 500, in turn, performs the processing for ATM layer and the processing for physical layer on the higher speed ATM transmission line side between the interface block for UDT mode line emulation 300 and the higher speed ATM transmission line.

Next, the frame relay interface block 500 performs circuit termination processing in frame relay services provided by a lower speed frame relay transmission line, which is a PDH transmission line, such as DSn, En, J2 and so on, termination processing for frame relay, processing for AAL layer of AAL type 5, and part of the processing for ATM layer. The higher speed line interface block 500, in turn, performs the rest of the processing for ATM layer and the processing for physical layer on the high-speed ATM transmission side between the frame relay interface block 500 and the higher speed ATM transmission line.

As described above, in the multiplexer of this embodiment the processing for ATM layer for the lower speed AT transmission line, the SDT circuit transmission line and the UDT circuit transmission line, and part of the processing for ATM layer for the frame relay transmission line are collectively performed in the higher speed line interface block 500.

Moreover, the above processing can be performed by substantially commonly using the same functional blocks of the higher speed line interface block 500 for performing the processing for ATM layer because of common characteristics of the processing contents. In addition, part of the processing for AAL layer performed by the higher speed line interface block 500 for the SDT circuit transmission line can also be carried out utilizing the functional blocks of the higher speed line interface block 500 for performing the processing for ATM layer, as will be described later.

Next, the respective blocks of the multiplexer according to this embodiment will be described below in greater detail.

Figure 2:
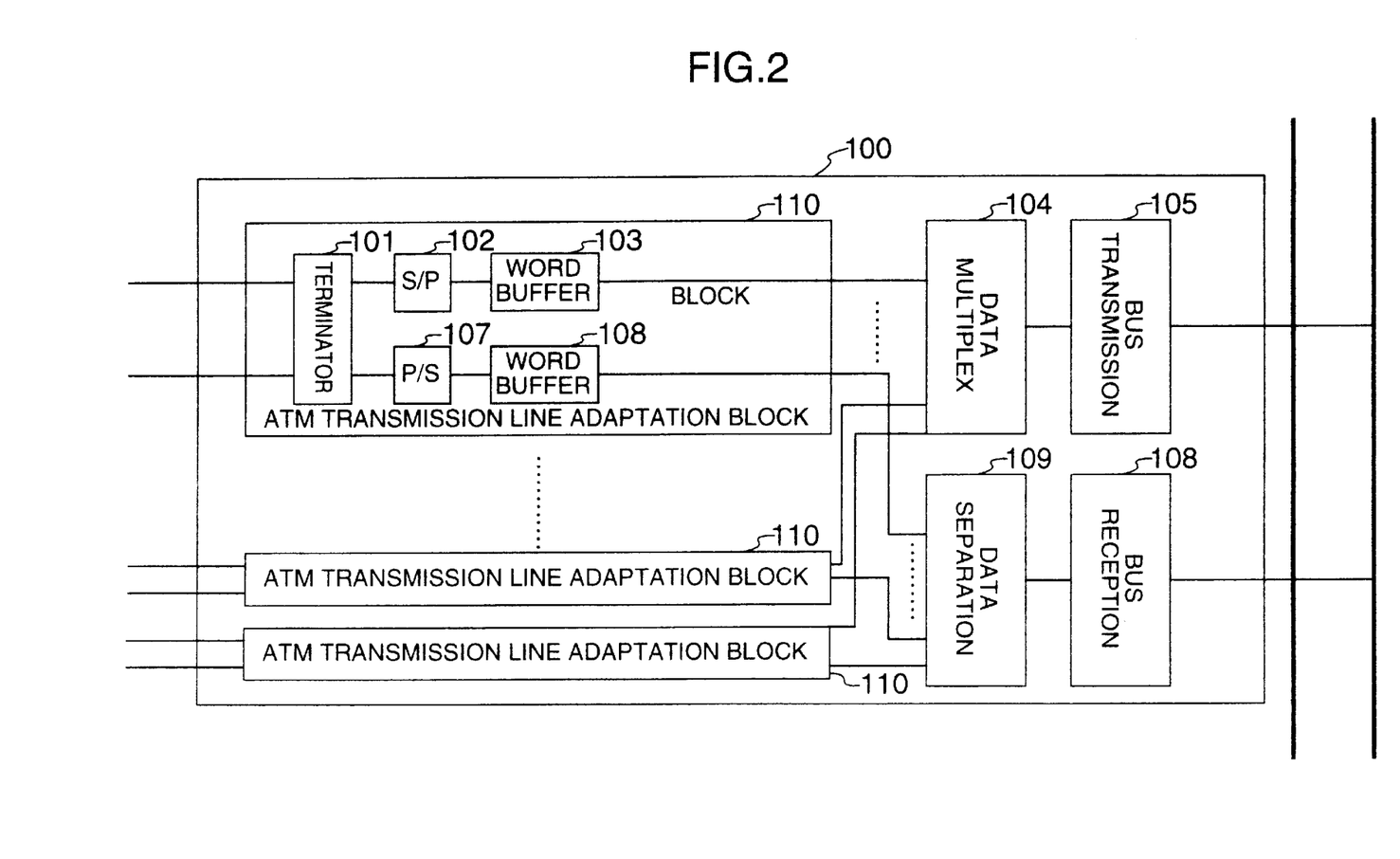
FIG. 2 is a block diagram illustrating the configuration of a lower speed ATM line interface block.

First, the lower speed ATM line interface block 100 will be described.

FIG. 2 illustrates the configuration of the lower speed ATM line interface block 100.

As illustrated, the lower speed ATM line interface block 100 comprises, for each of lower speed ATM transmission lines accommodated therein, a lower speed ATM transmission line adaptation block 110 which is composed of a terminator 101 for performing circuit termination for a lower speed ATM transmission line; a serial/parallel converter 102; word buffers 103, 106; and a parallel/serial converter 107. In each of the lower speed ATM transmission line adaptation block 110, a corresponding lower speed ATM transmission line is terminated in the terminator 101, and a signal received from the lower speed ATM transmission line is converted byte by byte into a parallel form in the serial/parallel converter 102 and then temporarily stored in the word buffer 103. Signals stored in the word buffer 103 of each lower speed ATM transmission line adaptation block 110 are multiplexed in a data multiplex block 104, and transmitted to the higher speed line interface block by a bus transmission block 105 using a time slot on the time-division bus 600 assigned to the lower speed ATM line interface block 100.

On the other hand, signals transmitted from the higher speed line interface block using a lime slot assigned to the lower speed ATM interface unit 100 are received by a bus reception block 108, separated by a data separation block 109 to be signals for each of the respective lower speed ATM transmission line adaptation blocks 110, and sent to the respective lower speed ATM transmission line adaptation blocks 110. In this event, the signals sent to the lower speed ATM transmission line adaptation block 110 are in the form of ATM cell. Signals sent to each lower speed ATM transmission line adaptation block 110 are once stored in the word buffer 106, converted into serial signals by the parallel/serial converter, and subsequently transmitted to an associated lower speed ATM transmission line through the terminator 101.

In this way, the lower speed ATM line interface block 100 only performs the processing for converting signals received from lower speed ATM transmission lines into a parallel form to transmit the parallel signals to the higher speed line interface block 500 using a predetermined time slot on the time-division bus 600, and, conversely, the processing for converting signals in a predetermined time slot on the time-division bus 600 received from the higher speed line interface block 500 into serial signals to transmit the serial signals to lower speed ATM transmission lines. Also, signals transmitted and received between the lower speed ATM line interface block 100 and the higher speed line interface block 500 using the time-division bus 600 form ATM cells.

Figure 3:
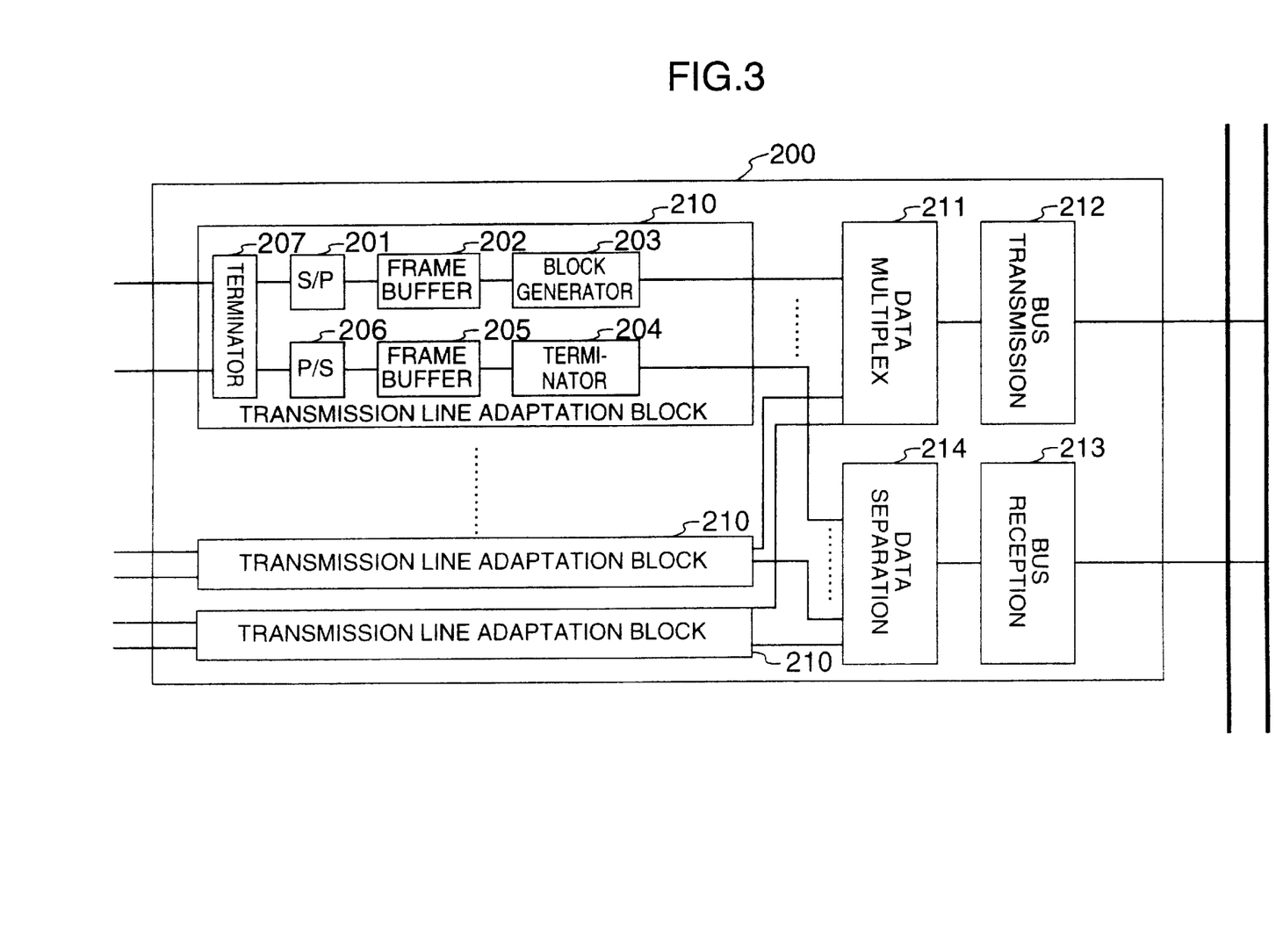
FIG. 3 is a block diagram illustrating the configuration of an interface block for SDT mode circuit emulation.

Next, the interface block for SDT mode circuit emulation 200 will be described.

FIG. 3 illustrates the configuration of the interface block for SDT mode circuit emulation 200.

A SDT circuit transmission line accommodated in the interface block for SDT mode circuit emulation transfers structured data. Specifically, this transmission line transmits a plurality of multiplexed 64 kbit/s channel signals, for example, at a transmission rate of an integer multiple of 64 kbit/s.

As illustrated, the interface block for SDT mode circuit emulation 200 comprises transmission line adaptation blocks 210 each provided for one of SDT circuit transmission lines; a data multiplex block 211; a bus transmission block 212; a bus reception block 213; and a data separation block 214. The transmission line adaptation block 210 in turn comprises a terminator 207 for terminating SDT circuit services provided by an associated SDT circuit transmission line; a serial/parallel converter 201; a frame buffer 202; an AAL1 structured block generator 203; an AAL1 structured block terminator 204; a frame buffer 205; and a parallel/serial converter 206.

In each transmission line adaptation block 210, a signal from a SDT transmission line, terminated by the terminator 207, is converted into a parallel signal by the serial/parallel converter 201, and then stored once in the frame buffer 202. Subsequently, the parallel signal is converted into a structured block in compliance with the AAL type 1 protocol depending on the structure of the structured data in the AAL1 structured block generator 203. Respective structured blocks converted in each transmission line adaptation block 210 are multiplexed in the data multiplex block 211, and transmitted from the bus transmission block 212 to the higher speed line interface block 500 in a predetermined time slot on the time-division bus 600, as is the case of the foregoing lower speed ATM line interface block 100.

Conversely, signals sent from the higher speed line interface block 500 through a predetermined time slot on the time-division bus 600 are received by the bus reception block 213, separated into signals for respective transmission line adaptation blocks 210 in the data separation block 214, and sent to the respective transmission line adaptation blocks 210. Here, the signals sent to the respective transmission line adaptation blocks 210 are in the form of structured block.

In each transmission line adaptation block 210, a structured block is terminated in the AAL1 structured block terminator 203 in a procedure reverse to the generation of a structured block. Signals generated in the AAL1 structured block terminator 203 are once stored in the frame buffer 205, and then converted into serial signals in the parallel/serial converter 206. The serial signals are transmitted onto an associated SDT circuit transmission line through the terminator 207.

In this way, the interface block for SDT mode circuit emulation 200 is responsible for the generation and termination of structured data within the processing for AAL type 1. Signals transmitted and received between the interface block for SDT mode circuit emulation 200 and the higher speed line interface block 500 using a predetermined time slot on the time-division bus 600 form structured blocks.

Figure 4:
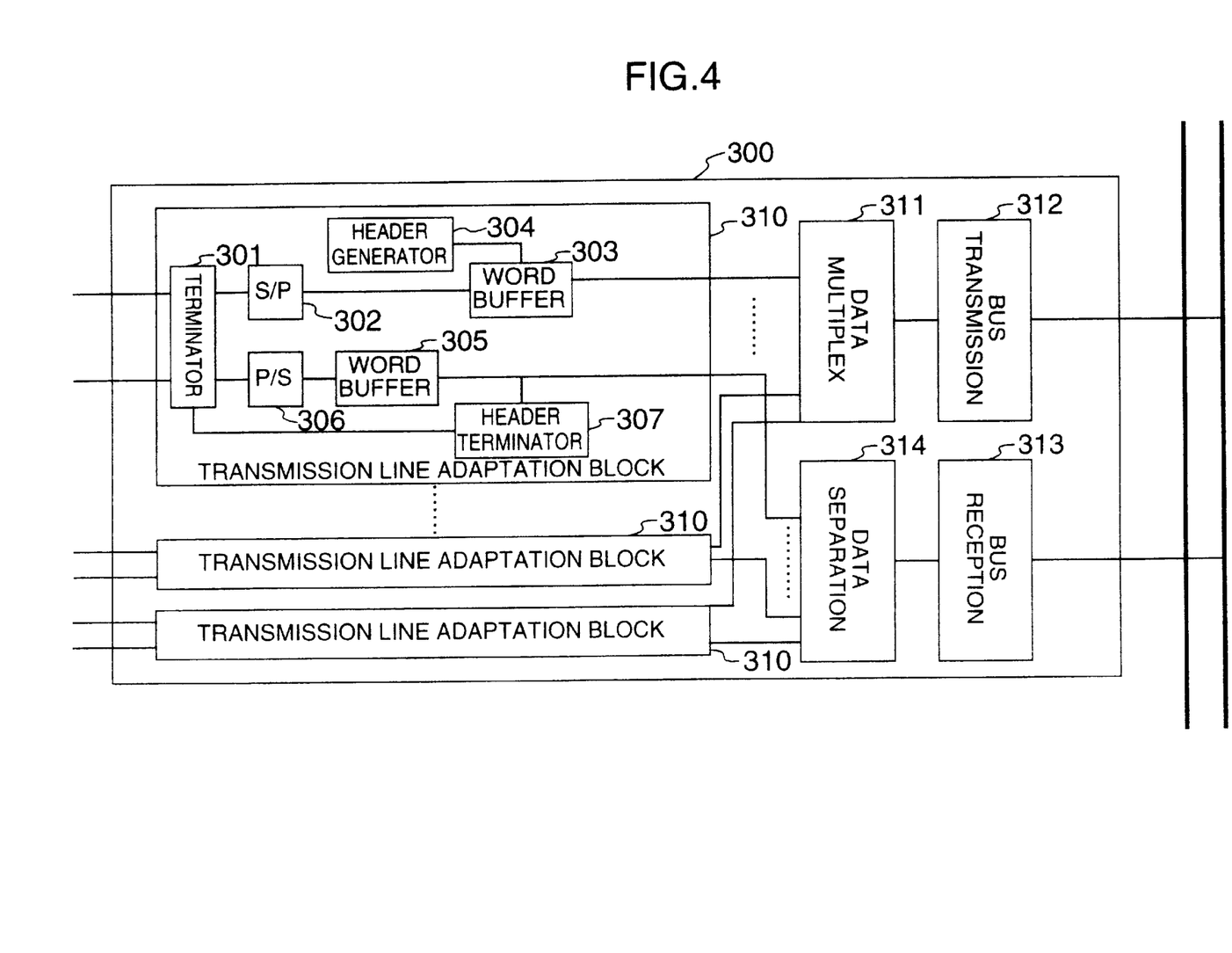
FIG. 4 is a block diagram illustrating an interface block for UDT mode circuit emulation.

Next, the interface block for UDT mode circuit emulation 200 will be described.

FIG. 4 illustrates the configuration of the interface block for UDT mode circuit emulation 300.

As illustrated in FIG. 4, the interface block for UDT mode circuit emulation comprises transmission line adaptation blocks 310 each provided for one of UDT circuit transmission lines; a data multiplex block 311; a bus transmission block 312; a bus reception block 313; and a data separation block 314. The transmission line adaptation block 310 in turn comprises a terminator 301 for terminating UDT circuit services provided by an associated UDT circuit transmission line; a serial/parallel converter 302; a word buffer 303; an AAL1 header generator 304; a word buffer 305; a parallel/serial converter 306; and an AAL1 header terminator 307.

In each transmission line adaptation block 310, a signal from a UDT transmission line, terminated by the terminator 301, is converted into a parallel signal by the serial/parallel converter 302, and then stored once in the word buffer 303. Also, in this event, the AAL1 header generator 304 generates a header for a SAR-PDU frame in compliance with the AAL type 1 protocol, and adds the header to the signal generated by the serial/parallel converter 302. The signal thus added the header for SAR-PDU frame and stored in the word buffer 303 is treated as a SAR-PDU frame which is defined as an interface of an AAL layer of AAL type 1 and an ATM layer.

In each transmission line adaptation block 310, signals stored in the word buffer 303 are multiplexed in the data multiplex block 311, and transmitted from the bus transmission block 312 to the higher speed line interface block 500 through a predetermined time slot on the time-division bus 600.

Conversely, signals sent from the higher speed line interface block 500 through a predetermined time slot on the time-division bus 600 are received by the bus reception block 313, separated into signals for each of the respective transmission line adaptation blocks 310 by the data separation block 314, and sent to the respective transmission line adaptation blocks 310. Here, the signals transmitted to the respective transmission line adaptation blocks 310 are in the form of SAR-PDU frame.

In each transmission line adaptation block 310, the SAR-PDU header for SAR-PDU frame is removed in the AAL1 header terminator 307, and processing in accordance with the contents of this header is performed. For example, a clock is generated in accordance with a time stamp in the header. Then, the signal with the header removed therefrom is written into the word buffer 305. The signal written into the word buffer 305 is converted into a serial form by the parallel/serial converter 306, and transmitted to an associated UDT circuit transmission line through the terminator 301.

In this way, the interface block for UDT mode circuit emulation 300 is responsible for all processing except for the processing for segmenting a SAR-PDU frame into pieces of 48-byte length, which is the payload length of the ATM cell, within the processing for AAL type 1. The signals transmitted and received between the UDT circuit emulation interface block 300 and the higher speed line interface block 500 using a predetermined time slot on the time-division bus 600 form SAR-PDU frames.

Figure 5:
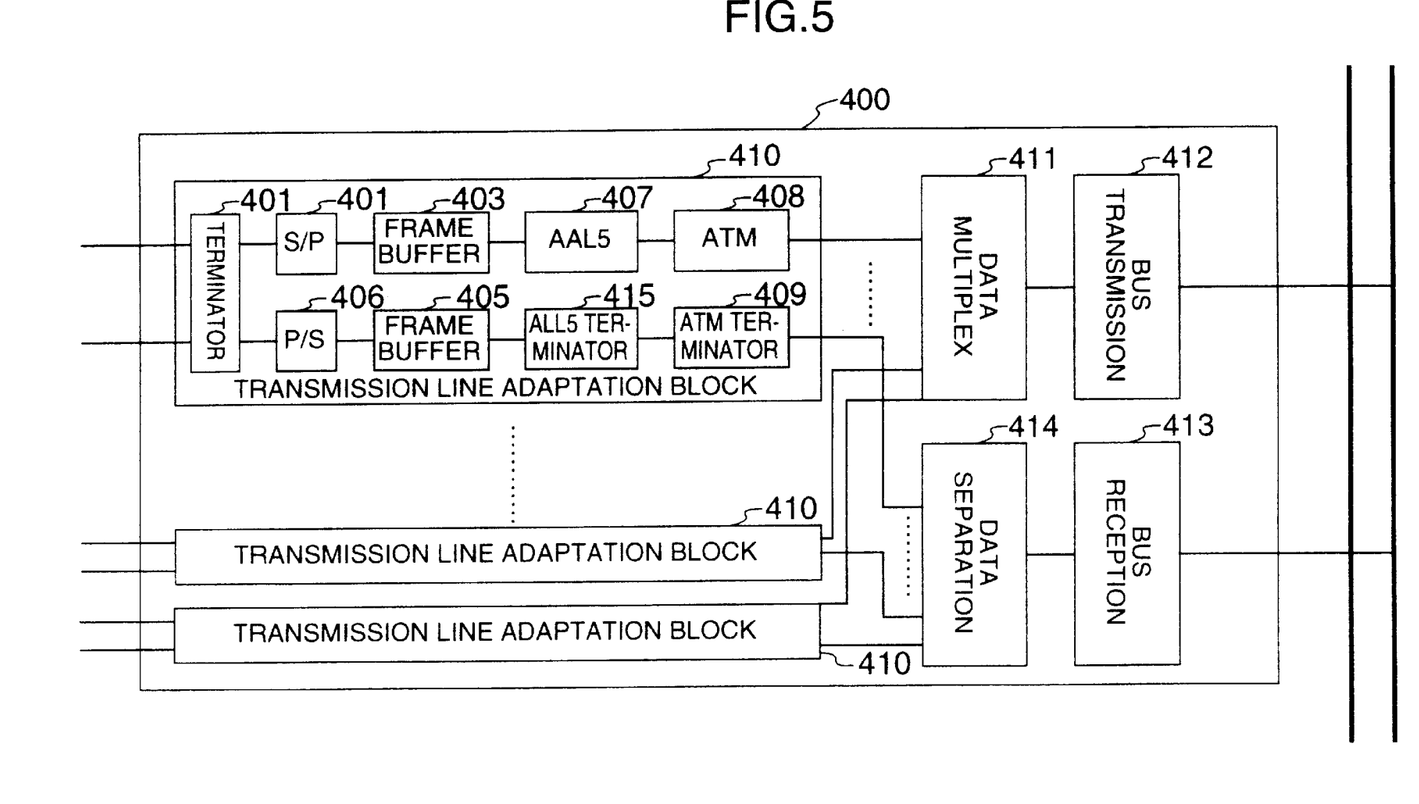
FIG. 5 is a block diagram illustrating the configuration of a frame relay interface block.

Next, the frame relay interface block 400 will be described.

FIG. 5 illustrates the configuration of the frame relay interface block 400.

As illustrated in FIG. 5, the frame relay interface block 400 comprises transmission line adaptation blocks 410 each provided for one of frame relay transmission lines; a data multiplex block 411; a bus transmission block 412; a bus reception block 413; and a data separation block 414. The transmission line adaptation block 410 in turn comprises a terminator 401 including, for example, a HDLC controller and so on for terminating frame relay services provided by an associated frame relay transmission line; a serial/parallel converter 402; a frame buffer 403; an AAL5 processing block 407; an ATM cell generator 408; an ATM cell terminator 409; an AAL5 terminator 415; a frame buffer 405; and a parallel/serial converter 406.

In each transmission line adaptation block 410, a signal from a frame relay transmission line, terminated by the terminator 401, passes through the serial/parallel converter 402, and is stored once in the frame buffer 403. The AAL5 processing block 407 generates SAR-PDU frames including signals read from the frame buffer 403 in compliance with an AAL5 protocol. The ATM processor 408 performs processing for segmenting the SAR-PDU frames into 48-byte pieces to generate ATM cells 48 bytes of payload. The processing for generating an ATM cell includes scrambling of a payload, addition to the payload of an ATM header including HEC generated for error correction and a destination address of the ATM cell, and so on. It should be noted here that an address locally used within the multiplexer is included in the ATM header as the destination address.

In each transmission line adaptation block 410, generated ATM cells are multiplexed by the data multiplex block 411, and transmitted from the bus transmission block 412 to the higher speed line interface block 500 through a predetermined time slot on the time-division bus 600.

Conversely, signals sent from the higher speed line interface block 500 through a predetermined time slot on the time-division bus 600 are received by the bus reception block 413, separated into signals for each of the transmission line adaptation blocks 410 by the data separation block 414, and sent to the respective transmission line adaptation blocks 410. Here, the signals sent to the respective transmission line adaptation blocks 410 form ATM cells each including the aforementioned local address in the ATM header.

In each transmission line adaptation block 410, the ATM terminator 409 performs termination processing for ATM layer such as descrambling of payloads of ATM cells, collects signals in the descrambled payloads into SAR-PDU frames, and sends the SAR-PDU frames to the AAL5 terminator 415. The AAL5 terminator 415 performs processing in compliance with the AAL5 protocol, performs processing in accordance with the contents of a header and a trailer of a SAR-PDU frame, and writes the signals in the payloads into the frame buffer 405. The signals written into the frame buffer 405 pass through the parallel/serial converter 406, and are transmitted onto a frame relay transmission line through the terminator 401 as frames suitable for frame relay serviced by the transmission line.

In this way, the frame relay interface block 400 is responsible for all processing for AAL layer and all processing for ATM layer. However, the address included in an ATM header is a local address. Also, signals transmitted and received between the frame relay interface block 400 and the higher speed line interface block 500 through a predetermined time slot form ATM cells.

Figure 6:
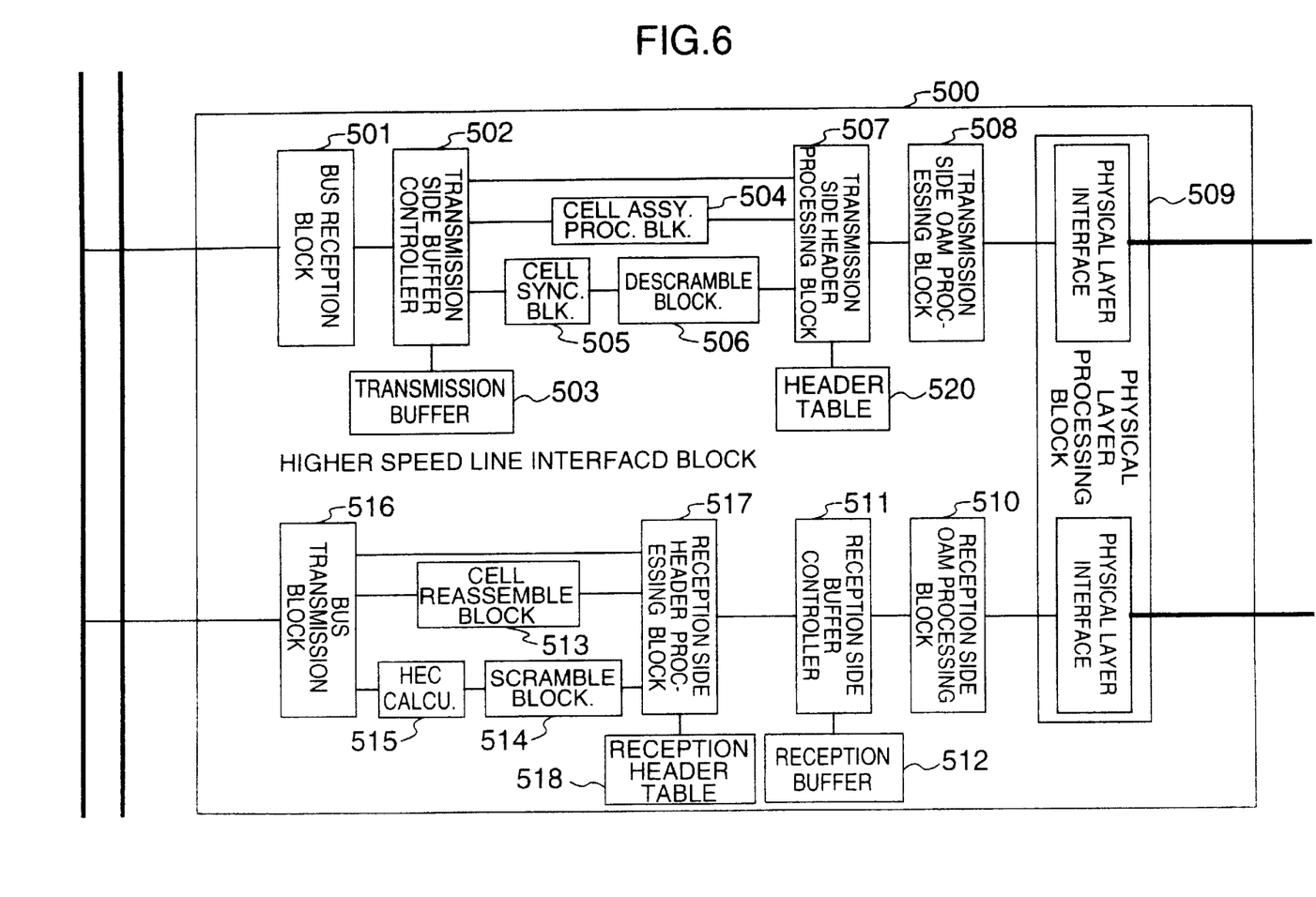
FIG. 6 is a block diagram illustrating the configuration of a higher speed line interface block.

Next, the higher speed line interface block 500 will be described.

FIG. 6 illustrates the configuration of the higher speed line interface block 500.

As illustrated in FIG. 6, the higher speed line interface block 500 comprises a bus reception block 501; a transmission side buffer controller 502; a transmission side buffer 503; a cell assembly processing block 504; a cell synchronization block 505; a descramble block 506; a transmission side header processing block 507; a transmission side OAM processing block 508; a physical layer processing block 509; a reception side OAM processing block 510; a reception side buffer controller 511; a reception side buffer 512; a cell reassemble block 513; a scramble block 514; a HEC calculation block 515; a reception side header processing block 517; a reception side header table 518; a bus transmission block 516; and a header table 520.

In the configuration as mentioned above, the bus reception block 501 receives signals respectively transmitted by the lower speed ATM line interface block 100, the interface block for SDT mode circuit emulation 200, the interface block for UDT mode circuit emulation 300 and the frame relay interface block 400 through associated time slots on the time-division bus 600. the transmission side buffer controller 402 stores signals received by the bus reception block 501 in the transmission side buffer 503 separately for each of lower speed side transmission lines (the lower speed ATM transmission lines, SDT circuit transmission line, UDT circuit transmission line and frame relay transmission line).

Since the lower speed ATM line interface block 100 and the frame relay interface block 400 transmit ATM cells onto the time-division bus 600 as described above, the ATM cells are stored in the transmission side buffer 503 separately for each of the lower speed ATM transmission line and the frame relay transmission line. Also, structured blocks are transmitted from the interface block for SDT mode circuit emulation to the time-division bus 600, while SAR-PDU frames are transmitted from the UDT circuit emulation interface block 300 to the time-division bus 600, so that the structured blocks and the SAR-PDU frames are stored in the transmission side buffer 503 separately for a SDT transmission line and a UDT transmission line.

The transmission side buffer controller 502 manages the amount and storing location of a signal stored in the transmission side buffer for each transmission line, and sends stored ATM cells to the cell synchronization block 507; SAR-PDU frames to the transmission side header processing block 507; and structured blocks to the cell assembly block 504.

Specifically, for a SAR-PDU frame, when 48 bytes of signal for a certain transmission line have been stored in the transmission side buffer, the transmission side buffer controller 502 retrieves the 48-byte signal and sends it to the transmission side header processing block 507. Every time the header processing block 507 receives 48 bytes, the header processing block 507 generates an ATM cell including the 48 bytes as a payload, and sends the ATM cell to the physical layer processing block 509 through the transmission side OAM processing block 508. Performed in this processing for generating an ATM cell performed by the transmission side header processing block 507 are the generation of HEC for error correction in accordance with the contents of a payload, addition to the payload of an ATM header including a destination address defined on the basis of a correspondence separately stored in the header table 520, and so on.

On the other hand, for a structured block, the transmission side buffer controller 502 sends every number of bytes (46 bytes or 47 bytes) specified by the cell assembly block of signals stored in the transmission side buffer to the cell assembly block.

Figure 7:
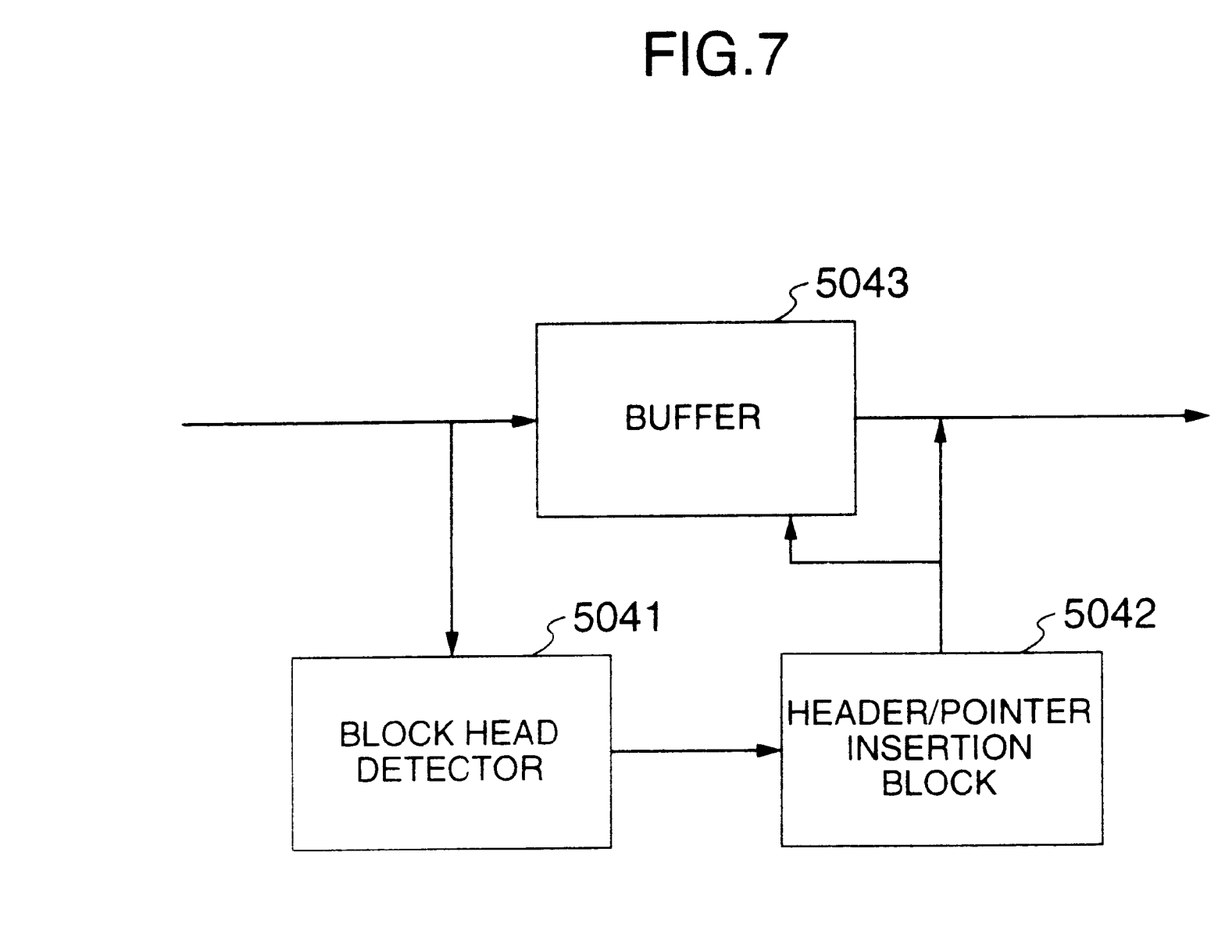
FIG. 7 is a diagram illustrating the configuration of a cell assembly block.

Now, FIG. 7 illustrates the structure of the cell assembly block 504.

In FIG. 7, structured blocks read from the transmission side buffer 503 are stored in a buffer 5043. In this event, a block head detector 5041 detects the head of a structured block based on a pointer included in the structured block. A header/pointer insertion block 5042 generates an ATM cell payload illustrated in FIG. 8(a) when the block head detector 5041 fails to detect the head of a block, and generates an ATM cell payload illustrated in FIG. 8(b) when the block head detector 5041 does not detect the head of a block.

Figure 8:
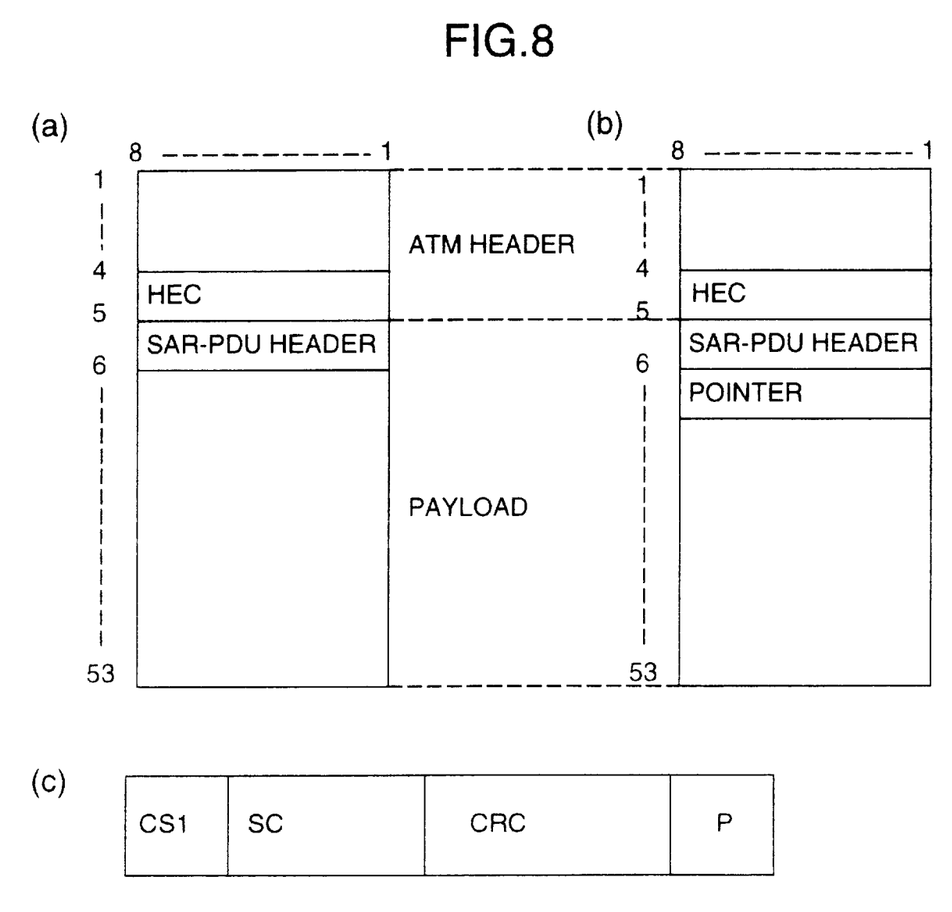
FIG. 8 is a diagram illustrating the structure of an ATM cell generated using AAL type 1.

Specifically, the header/pointer insertion block 5042 reads 47 bytes of data from the buffer 5043 when the block head detector 5041 does not detect the head of a block, and adds one byte of generated SAR-PDU header thereto to generate a payload. Here, the SAR-PDU header includes CSI (Convergence Sublayer Indication), a sequence number SC for cyclically indicating the order of a cell, CRC for error detection and a parity P, as illustrated in FIG. 8(c). The header/pointer insertion block 5042 sets zero in CSI when the block head detector 5041 fails to detect the head of a block. Also, in this case, the transmission side buffer controller 502 is requested to read the next 47 bytes from the transmission side buffer 503.

On the other hand, when the block head detector 5041 does detect the head of a block, the block head detector 5041 reads 46 bytes of data from the buffer 5043, adds one byte of SAR-PDU header and one byte of pointer thereto to generate a payload. Also, in this event, the CSI is set to one to indicate that the pointer is included therein. Also, in this case, the transmission side buffer controller 502 is requested to read the next 46 bytes from the transmission side buffer 503. It should be noted that even if the block head detector 5041 detects the head of a block, the header/pointer insertion block 5042 generates the payload illustrated in FIG. 8(b) only if the sequence number SC indicates an even number. In addition, the payload illustrated in FIG. 8(b) is generated only once for a predetermined group of sequence numbers.

The 48-byte payload of ATM cell thus generated is sent to the transmission side header processing header 507, wherein an ATM header is added thereto, and then sent to the physical layer processing block 509 through the transmission side OAM processing block 508.

Next, the transmission side buffer controller 502 sends every number of bytes specified by the cell synchronization block 505 of signals stored in the transmission side buffer 503 to the cell synchronization block 505 for the ATM cell.

Here, the cell synchronization block 505 performs processing in synchronism with the ATM cell, and corrects the ATM header based on HEC included in the ATM header.

Next, synchronization control for the ATM cell will be outlined.

The synchronization of the ATM cell is controlled through transitions of the following three states: a hunting state in which HEC cannot be detected in an ATM cell; pre-synchronization in which it is confirmed that the processing is synchronized with ATM cells a predetermined number of times in succession after the processing got rid of the hunting state; and establishment of synchronization in which it is confirmed that the processing is synchronized with ATM cells a predetermined number of times in succession when it can be confirmed in the pre-synchronization that the processing has been synchronized with ATM cells a predetermined number of times in succession. Stated another way, a transition to the pre-synchronization is made when HEC can be detected in an ATM cell in the hunting state; a transition to the establishment of synchronization is made when it can be confirmed that the processing has been synchronized with ATM cells the predetermined number of times in succession in the pre-synchronization; and a transition to the hunting state is made when it is detected that the processing has not been synchronized with ATM cells the predetermined number of times in succession in the establishment of synchronization. In addition, if it is detected that the processing is not synchronized with ATM cells in the pre-synchronization, a transition to the hunting state is made.

Here, in the cell synchronization block 505, the ATM cell synchronization state corresponds to a state in which signals can be correctly read from the transmission side buffer in units of ATM cells, and the processing for correcting the value of the ATM header can be performed on the basis of HEC included in the ATM header.

Figure 9:
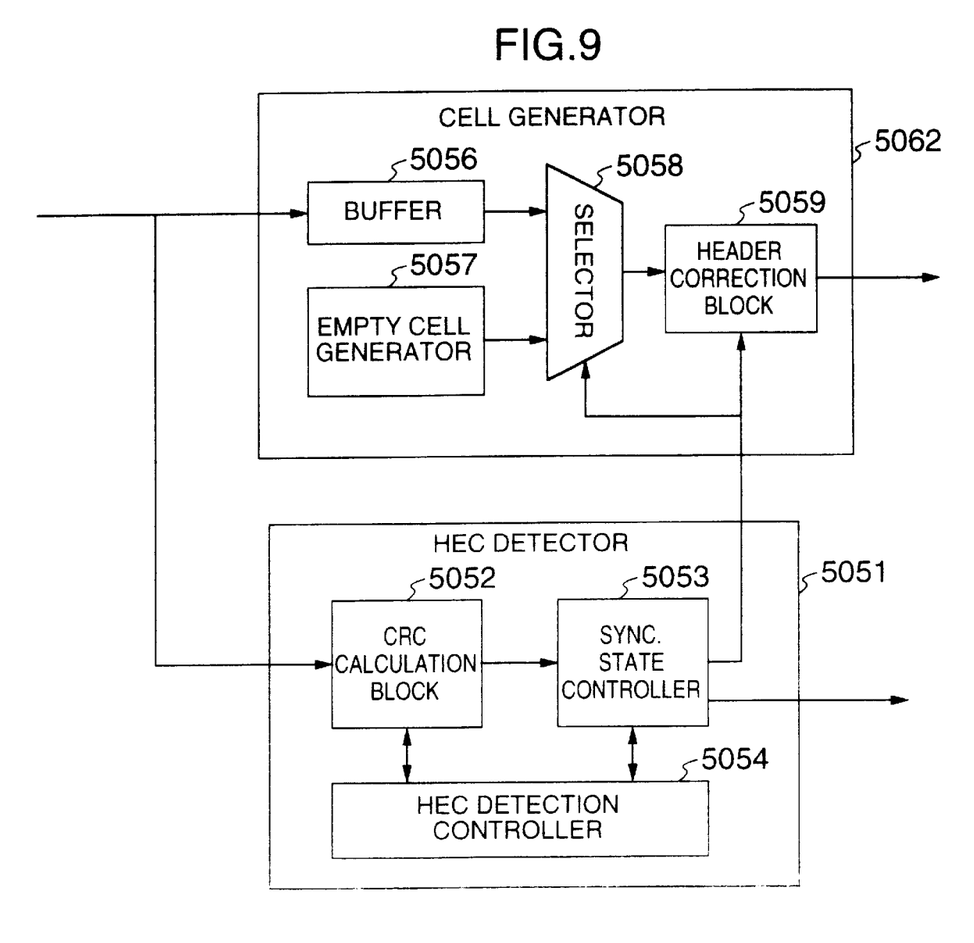
FIG. 9 is a block diagram illustrating the configuration of a cell synchronization block.

FIG. 9 illustrates the configuration of the cell synchronization block 505. As illustrated, the cell synchronization block includes a HEC detector 5051 and a cell generator 5062.

In the HEC detector 5051, a synchronization state controller 5053 manages the foregoing three synchronization states, and requests the transmission side buffer controller 502 to send every 53 bytes of signals in the transmission side buffer 503 when in the hunting state. In the hunting state, a CRC calculation block 5052 regards each byte sent from the transmission side buffer 503 as HEC, compares the byte with the preceding 4-byte CRC, and determines that the byte regarded as HEC is HEC when the byte regarded as HEC matches the CRC. This determination relies on the fact that HEC exists at the fifth byte of an ATM header of an ATM cell and represents the preceding 4-byte CRC.

When HEC is detected in the hunting state in this way, a HEC detection controller 5054 informs the synchronization state controller 5053 that the hunting state should be transitioned to the pre-establishment state. The HEC detection controller 5054 also informs the synchronization state controller 5053 of a position h at which HEC has been detected within 53 bytes read from the transmission side buffer 503. In the pre-synchronization state, the synchronization state controller 5053, which has received a position h-5, requests the transmission side buffer controller 502 to discard the higher h-5 bytes within signals stored in the transmission side buffer 503 and to send subsequent 53 bytes.

The HEC detection controller 5054 counts the number of times HEC is successively found at the fifth byte (the number of times h-5 is zero in succession) in the pre-synchronization state, and informs the synchronization state controller 5053 that the pre-establishment state should be transitioned to the synchronization established state when a predetermined number of times is reached.

In the synchronization established state, the synchronization state controller 5053 ignores m sent from the CRC calculation block 5052, and requests the transmission side buffer controller 502 to send every 53 bytes of signals stored in the transmission side buffer 503. The CRC calculation block 5052 in turn detects HEC in the 53 bytes in a manner similar to the foregoing. The HEC detection controller 5054 counts the number of times HEC is not successively found at the fifth byte (the number of times h-5 is not zero in succession) in the synchronization established state, and informs the synchronization state controller 5053 that the synchronization established state should be transitioned to the pre-synchronization established state when a predetermined number of times is reached.

Subsequently, transitions will be made between the pre-synchronization state and the synchronization established state in a similar manner. A transition to the hunting state is normally found only in an initial state.

In the cell generator 5062, on the other hand, signals sent from the transmission side buffer 503 in units of 53 bytes are once stored in the buffer 5056 and subsequently sent to a header correction block 5059 through a selector 5058 when in the synchronization established state. When an ATM header has an error, the header correction block 5059 corrects the header, if the error can be corrected, based on HEC at the fifth byte, and outputs the corrected signal.

In the hunting state and in the pre-synchronization state, the selector 5058 selects an empty ATM cell generated by an empty cell generator 5057, so that the header correction block 5059 outputs the same.

Turning back to FIG. 6, the descramble block 506, when receiving an ATM cell outputted from the cell synchronization block 505, descrambles the ATM cell, and sends the descrambled ATM cell to the header processing block 507. The header processing block 507 performs conversion of an ATM header and the generation of HEC, in accordance with a correspondence stored in the header table 520, and subsequently sends the ATM cell to the physical layer processing block 509 through the transmission side OAM processing block 508.

The physical layer processing block 509 multiplexes ATM cells sent thereto as described above in compliance with SDH n and OC-n protocols, transduces the multiplexed ATM cells into optical signals which are then transmitted to a higher speed transmission line.

When an ATM cell sent to the physical layer processing block 509 is an OAM cell, the transmission side OAM processing block 508 fetches this ATM cell, and performs management and control in accordance with its contents.

As to reception from the higher speed transmission line, the physical layer processing block 509 separates signals received from the higher speed transmission line into ATM cells. Each of the separated ATM cells is sent to the reception side buffer controller 511 through the reception side OAM processing block 510, and once stored in the reception side buffer 512.

Here, when an ATM cell sent thereto from the physical layer processing block 509 is an OAM cell, the reception side OAM processing block 510 fetches the ATM cell, and performs management and control in accordance with its contents.

ATM cells stored in the reception side buffer 511 are sequentially sent to the reception side header processing block 517 which analyzes the contents of associated ATM headers and determines a lower speed transmission line to which the ATM cells are to be sent (a lower speed ATM transmission line, a SDT circuit transmission line, a UDT circuit transmission line, or a frame relay transmission line). Then, ATM cells to be sent to a lower speed ATM transmission line and a frame relay transmission line are subjected to conversion of ATM cell headers based on a correspondence described in the reception side header table 518, and then sent to the scramble block 514, while ATM cells to be sent to a SDT circuit transmission line are sent to the cell reassembly block 513 after ATM headers are removed therefrom, and ATM cells to be sent to a UDT circuit transmission line are sent to the bus transmission block 516 after ATM headers are removed therefrom.

The scramble block 514 scrambles payloads of sent ATM cells and sends the scrambled ATM cells to the HEC calculation block 515. The HEC calculation block 515 calculates HEC for an ATM header of each ATM cell, overwrites HEC in the ATM header with the calculated HEC, and transmits the ATM cell to the bus transmission block 516.

The cell reassembly block 513, in turn, restores SAR-PDU frames from signals in payloads of ATM cells sent thereto, restores structured blocks from the SAR-PDU frames, and sends the structured blocks to the bus transmission block 516.

The bus transmission block 516 multiplexes respective signals sent thereto at positions assigned to a lower speed transmission line to which ATM cells, carrying the respective signals, are to be sent within a time slot assigned to the lower speed interface block accommodating the lower speed transmission line (the lower speed ATM line interface block 100, the interface block for SDT mode circuit emulation 200, the interface block for UDT mode circuit emulation 300 or the frame relay interface block 400) in accordance with the lower speed transmission line to which the ATM cells, carrying the respective signals, are to be sent, and then transmits the multiplexed signals onto the time-division bus.

Finally, a controller 700 in FIG. 1 is connected to terminators of respective lower speed transmission lines in the respective lower speed interface blocks (the lower speed ATM line interface block 100, the interface block for SDT mode circuit emulation 200, the interface block for UDT mode circuit emulation 300 and the frame relay interface block 400), the transmission side header table 520 in the higher speed line interface block 500 and the reception side header table 528, and controls the destination of each signal by describing the aforementioned correspondence in the transmission side header table 520 and the reception side header table 528 based on the destination of a signal derived at a terminator of an associated lower speed transmission line.

The multiplexer according to this embodiment has been described above.

In the foregoing description, the generation and termination of a SAR-PDU frame have been described as performed in the interface block for UDT mode circuit emulation 300. Alternatively, the AAL1 header generator 304 and the header terminator 307 may be omitted from the interface block for UDT mode circuit emulation 300, such that the generation and termination of the SAR-PDU frame may be performed in the cell assembly block 504 and the cell reassembly block 513 of the higher speed line interface block 500, as they are performed for signals which are transmitted and received by the interface block Lor SDT mode circuit emulation 200. Such processing may be realized by skipping the aforementioned processing for generating a pointer in the cell assembly block 504 and restoration of structured blocks in the cell reassembly block 513 for signals transmitted and received by the interface block for UDT mode circuit emulation 300.

Also, the AAL5 processing and the ATM cell generation and termination processing in the frame relay interface block 400 may not be performed in the frame relay interface block 400 but in the higher speed line interface block 500. Specifically, the higher speed line interface block 500 may perform the AAL5 processing and the ATM cell generation processing, which would otherwise be performed in the frame relay interface block 400, for signals read from the transmission side buffer 503, and may perform the ALL5 processing and ATM cell termination processing, which would otherwise be performed in the frame relay interface block 400, for signals read from the reception side buffer 512.

Figure 10A:
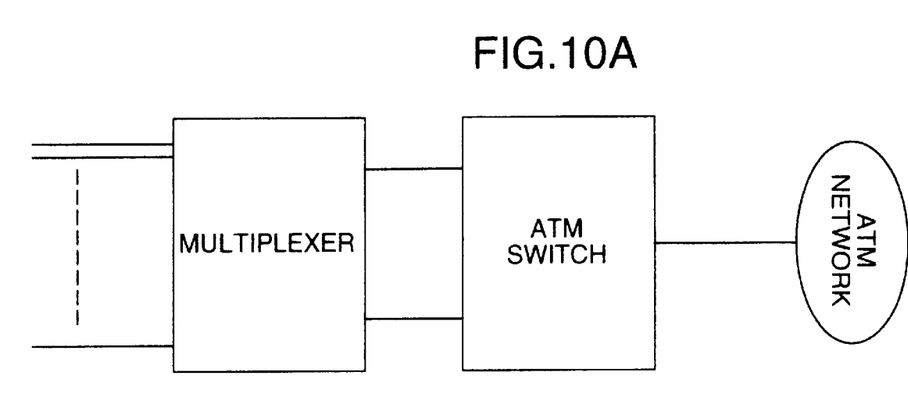
FIGS. 10A and 10B are diagrams illustrating configurations of a variety of systems using a multiplexer.
Figure 10B:
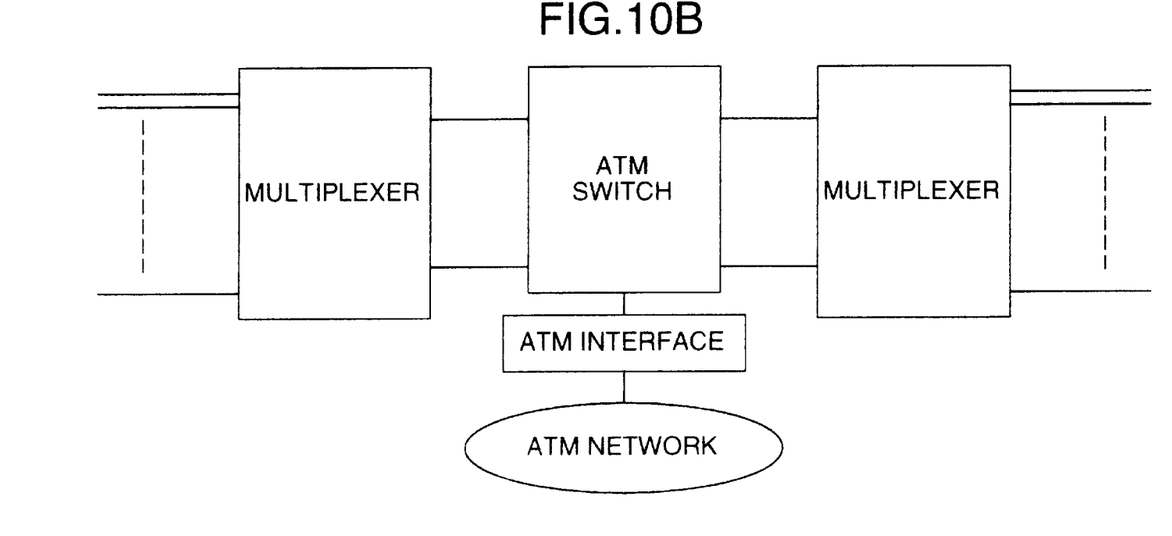

In addition, the multiplexer according to this embodiment may be used to configure systems as illustrated in FIGS. 10A and 10B.

FIG. 10A illustrates a system in which higher speed transmission lines accommodated in the multiplexer are connected to an ATM switch. According to this configuration, an ATM network can be utilized from respective lower speed transmission lines. FIG. 10B is an example in which an ATM switch is provided between two multiplexers. According to this configuration, switching of signals among respective lower speed transmission lines as well as utilization of an ATM network from the respective lower speed transmission lines can be accomplished using the ATM switch.

As has been described above, according to the present invention, it is possible to provide a multiplexer which has a configuration more suitable for a reduction in scale.

What is claimed is:

1. A multiplexer for interworking signals between services provided using a lower speed transmission line and ATM services provided using a higher speed transmission line, comprising:

a higher speed line interface accommodating said higher speed transmission line;

a plurality of lower speed line interface accommodating lower speed transmission lines; and a time-division bus for connecting said higher speed line interface and each of said lower speed line interfaces, wherein said lower speed line interface comprises:

a service terminator for terminating services provided using a accommodated lower speed transmission line; and a bus interface for transmitting and receiving signals, transmitted and received using a terminated service, using a time slot assigned to said lower speed transmission line on said time-division bus, services provided by lower speed transmission lines accommodated in at least two lower speed line interfaces within said plurality of lower speed line interfaces are different for each lower speed line interface, and said higher speed line interface comprises:

a transmission side ATM processing block for generating ATM cells storing signals received from respective lower speed line interfaces through said time-division bus;

a physical layer processing block for multiplexing generated ATM cells to transmit multiplexed ATM cells onto said higher speed transmission line and for separating ATM cells from signals received from said higher speed transmission line; and a reception side ATM processing block for transmitting signals stored in each of the separated ATM cells to a lower speed line interface accommodating a lower speed transmission line to which said signals are to be transmitted, using a time slot on said time-division bus assigned to said lower speed line interface.

2. A multiplexer according to claim 1, wherein at least one lower speed line interface comprises:

an AAL (ATM Adaptation Layer) processing block for generating a signal to be sent from said bus interface to said higher speed line interface by adding predetermined information for controlling or managing transmission of said signal to a signal received using a terminated service, for extracting said information from a signal received by said bus interface from said higher speed line interface to control or manage transmission of the signal in accordance with the extracted information, and for passing the signal with said information removed therefrom to said service terminator as a signal to be transmitted using a service provided by said lower speed transmission line.

3. A multiplexer according to claim 1, wherein said higher speed line interface comprises:

an AAL (ATM Adaptation Layer) processing block for generating a signal to be stored in an ATM cell by said transmission side ATM processing block by adding predetermined information for controlling or managing transmission of said signal to a signal received from said time-division bus, for extracting said information from a signal stored in each ATM cell separated by said physical layer processing block to control or manage transmission of a signal in accordance with the extracted information, and for sending the signal with said information removed therefrom to a lower speed line interface through said time-division bus.

4. A multiplexer according to claim 2, wherein said higher speed line interface comprises:

an AAL (ATM Adaptation Layer) processing block for generating a signal to be stored in an ATM cell by said transmission side ATM processing block by adding predetermined information for controlling or managing transmission of said signal to a signal received from said time-division bus, for extracting said information from a signal stored in each ATM cell separated by said physical layer processing block to control or manage transmission of a signal in accordance with the extracted information, and for transmitting the signal with said information removed therefrom to a lower speed line interface through said time-division bus.

5. A multiplexer according to claim 1, wherein:

services provided by a plurality of lower speed transmission lines accommodated by said plurality of lower speed line interfaces include at least an ATM service and a circuit service.

6. A multiplexer according to claim 2, wherein:

services provided by a plurality of lower speed transmission lines accommodated by said plurality of lower speed line interfaces include at least an ATM service and a circuit service.

7. A multiplexer according to claim 3, wherein:

services provided by a plurality of lower speed transmission lines accommodated by said plurality of lower speed line interfaces include at least an ATM service and a circuit service.

8. A multiplexer according to claim 4, wherein:

services provided by a plurality of lower speed transmission lines accommodated by said plurality of lower speed line interfaces include at least an ATM service and a circuit service.

* * * * *